March 13, 1945. G. J. BRAUN 2,371,377
TOOL HOLDER
Filed Aug. 9, 1943
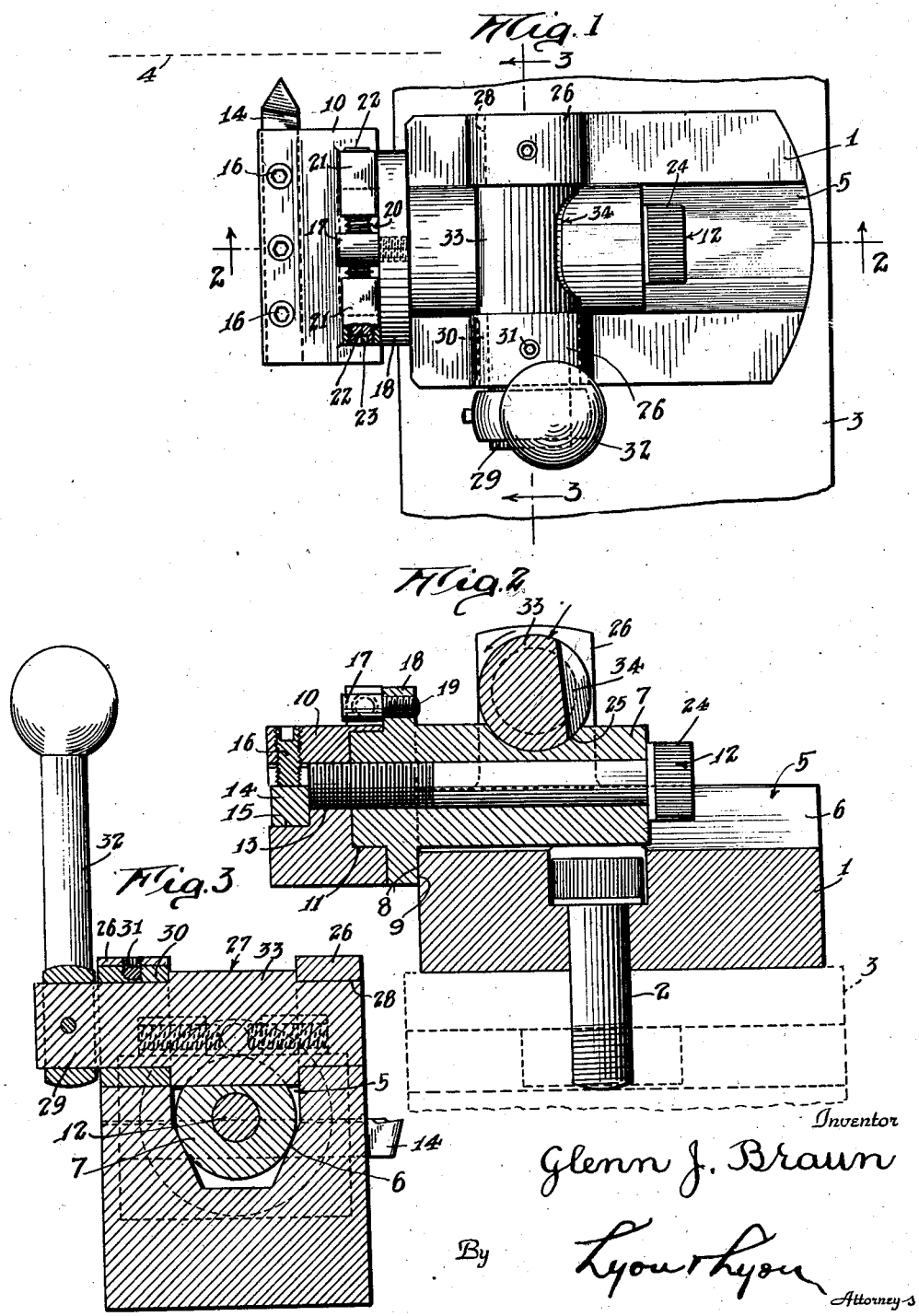

Patented Mar. 13, 1945

2,371,377

UNITED STATES PATENT OFFICE 2,371,377

TOOLHOLDER

Glenn J. Braun, Huntington Park, Calif.

Application August 9, 1943, Serial No. 497,929

6 Claims. (Cl. 82—37)

This invention relates to a tool-holder such as employed in machine tools for supporting a cutting tool or cutter, and while features of the invention may be employed for different specific purposes, in the present specification the invention is applied as a mounting for a cutter such as employed in a lathe or similar machine tool, for removing metal from a work-piece.

An object of the invention is to provide simple means for supporting and securing a cutter tool in proper relation for enabling its point to be applied to the work.

Another object of the invention is to provide a simple construction such as referred to above, in which the clamping-up operation which clamps or secures the cutter in position, will operate to hold the cutter in a definite and predetermined position with respect to the slide or base on which the tool-holder is mounted, and which, of course, will hold the tool-holder securely against any accidental or undesired movement from its cutting position.

In its preferred embodiment, this tool-holder involves the use of an open channel in which the tool-holder is secured, and this channel is formed in a base presenting an end face disposed in a plane substantially at right angles to the axis of the channel. One of the objects of the invention is to provide simple means for locking the tool-holder in this channel, and for simultaneously exerting a force to abut the transverse shoulder on the tool-holder against the said end face of the base. And in connection with the channel, a special object of the invention is to provide a form for this channel, that will enable tool-holders of slightly different diameters, to be clamped with equal facility.

Another object of the invention is to provide a tool-holder of this type, with a tilting head or adjustable head in which the cutter is secured, and which is capable of adjustment into different oriented positions to tip the point of the tool up or down if desired, in the vicinity of the face of the work to which the tool is applied.

Further objects of the invention will appear hereinafter.

The invention consists in the novel parts and combination of parts to be described hereinafter, all of which contribute to produce an efficient tool-holder.

A preferred embodiment of the invention is described in the following specification, while the broad scope of the invention is pointed out in the appended claims.

In the drawing:

Fig. 1 is a plan of my tool-holder, and representing the same as mounted on a cross slide of a lathe or similar tool.

Fig. 2 is a vertical section taken on the line 2—2 of Fig. 1, and in this view the relation and position of the cross slide is indicated in dotted lines.

Fig. 3 is a vertical section taken about on the line 3—3 of Fig. 1, and particularly illustrating the locking means for securing the body of the tool-holder on its seat or channel.

In practicing the invention, I provide a base 1 which is in the form of a block secured by any suitable means such as a heavy machine screw 2, to the upper face of the cross slide 3 of a lathe or similar tool to which this invention is applied. Referring particularly to Fig. 1, it may be supposed that the cutter is to be applied to the side face of the work indicated by the dotted line 4. In order to mount the tool or cutter in accordance with my invention, the base 1 is provided with a deep channel 5, the axis of which extends substantially parallel with the axis of rotation of the work in the lathe, and this channel preferably presents two side faces or cheeks 6 that converge toward each other in a downward direction (see Fig. 3). These converging cheeks form a seat to receive the body 7 of the tool carrier or holder that is preferably of round or cylindrical form, and formed at its forward end so that it will present a transversely extending shoulder 8 that is adapted to fit up against the adjacent end face 9 of the base 1. The forward end of the body 7 of the holder is preferably provided with a tilting head or swivel head 10 that is mounted to rotate on the axis of the body 7, and which can be secured thereto in different oriented positions with respect to the axis of the body 7. This tilting head 10 is preferably formed with a bore 11 on the axis of the body 7, to fit over the projecting end of the body, and within the body 7 a clamping screw or bolt 12 is provided, the end of which is threaded and received in a threaded opening 13 extending into the back of the tilting head 10. The outer and forward face of the tilting head 10 is provided with suitable means for securing the cutter 14 to the tilting head, and in the present instance, this means involves the use of a transversely disposed square or angular groove 15 which receives a similarly shaped cutter, such as the tool or cutter 14. When the tool or cutter has been put in position in its groove or seat 15, it can be clamped in position there by means of Allen screws 16 or similar set screws which are mounted in threaded openings on the upper side of the tilting head. This tilting head is of substantially block form.

In order to facilitate the adjustment of the tilting head to hold the point of the cutter 14 in a more or less elevated position, I prefer to provide correlated means between the tilting head and the forward end of the body 7, and in the present instance this means includes an extension or projection 17 that projects forwardly from the forward face of a flange 18 which is formed integrally at the forward end of the body 7, and the rear face of which forms the shoulder 8 referred to above. In the present instance, this extension 17 consists of a pin having a threaded shank 19 that is screwed into the flange 18. This pin 17 lies in a gap or throat 20 formed in the adjacent portion of the tilting head 10 and located between two oppositely disposed bosses or bolsters 21 in which two clamping screws 22 are threaded. These screws may also be of the Allen type, having sockets such as the socket 23 in their outer ends, to receive an angular wrench for tightening them up. (See Fig. 1.) By tightening up one of these screws 22, and backing off the opposite screw, the tilting head 10 can be tilted or oriented to any desired position with respect to the axis of the bolt 12. After making such an adjustment, the bolt 12 would be tightened up, as it would be necessary to loosen it slightly to effect the adjusting movement of the tilting head.

The butt end of the clamping screw or bolt 12 is formed with an angular head or milled head 24, for enabling it to be tightened up.

In order to enable the body 7 of the tool-holder to be readily clamped in position in the channel 5, and at the same time to force the transverse shoulder 8 up against the adjacent end face 9 of the base, I provide a concave socket 25 extending transversely across the holder on its upper side. The surface of this socket is preferably a surface of revolution, that is to say, it is a concave cylindrical face. The base 1 is provided with two oppositely disposed forks 26 that extend upwardly, and they support between them a rotatable locking pin 27. For this purpose one of the forks is provided with a bore 28 which fits neatly to a cylindrical trunnion on the forward end of the locking pin. A similar trunnion 29 is provided at the outer end of the locking pin, which fits neatly into the bore of a bushing 30 set into the other fork and secured therein by a small set screw 31. The outer end of the trunnion 29 is provided with a handle or lever 32 by means of which the locking pin can be rotated when desired. This locking pin has a cam form waist 33 which, in the present instance, consists of an eccentric portion of the pin 27. This waist or cam portion 33 is formed on one side with a notch 34 which, in the "open" position of the holder would be disposed in a substantially horizontal position. In this position the body 7 can be thrust under the pin from the forward end of the channel 5. By rotating the lever 32 in the direction to rotate the locking pin 27 in the direction indicated by the arrow in Fig. 2, the cam action of the eccentric waist 33 operates to force the body 7 downwardly against the inclined cheeks 6. At the same time, the axis of the eccentric or cam 33, is to tend to pull the shoulder 8 up against the face 9.

It will be evident that any forces acting upon the cutter 14 will be very effectively absorbed by the tilting head 10 through the agency of adjusting screws 22, which will resist any torque exerted by the reaction of the tool in making the cut, which torque will tend to rotate the body 7 of the tool-holder about its longitudinal axis. Furthermore, this torque is also resisted very effectively by the tight frictional contact on the side of the body 7 with the inclined cheeks 6 of the channel, and also by the contact between the face of the cam 33 and the transverse notch 25 in the upper face of the holder body 7.

The form of the channel 5 is most advantageous by reason of the use of the inclined faces or cheeks 6 which converge toward each other in a downward direction. This enables a wedging action and pressure against the sides of the carrier body 7, to be developed by the downward pressure of the cam at the upper side of the body. Furthermore, by reason of the clearance between the bottom of this channel and the under side of the body 7, this channel can operate with carrier bodies that are not exactly the same size. Hence, in manufacturing this device, it would be unnecessary to have a very small tolerance with the diameter of the body 7.

Many other embodiments of the invention may be resorted to without departing from the spirit of the invention.

What I claim is:

1. In a tool-holder for holding a cutter mounted in a machine-tool, the combination of a base having a channel therein, a tool-carrier adapted to rest in said channel and having a socket on the side thereof remote from the said channel, a rotatable locking-pin mounted on said base, located adjacent to said socket, said rotatable locking-pin having a notch on its side, and capable of assuming a position in which said notch provides clearance for passing said tool-carrier into position under said locking-pin, and cam-means associated with said pin adjacent said socket and cooperating with the same upon rotation of the said locking-pin, to clamp said carrier in said channel.

2. In a tool-holder for holding a cutter mounted in a machine-tool, the combination of a base having a channel therein, a tool-carrier adapted to rest in said channel and having a socket on the side thereof remote from the said channel, said tool-carrier having a transversely extending shoulder adapted to seat against a transverse face on said base, a rotatable locking-pin mounted on said base, located adjacent to said socket, said rotatable locking-pin having a notch on its side, and capable of assuming a position in which said notch provides clearance for passing said tool-carrier into position under said locking-pin, and cam-means associated with said pin adjacent said socket and cooperating with the same upon rotation of the said locking-pin, to clamp said carrier in said channel.

3. In a tool-holder for holding a cutter mounted in a machine tool, the combination of a base having a channel therein, a tool-carrier adapted to rest in said channel and having a socket on the side thereof remote from said channel, said tool-carrier having a transversely extending shoulder adapted to seat against a face on said base, locking means mounted on said base cooperating with said socket to clamp the tool-holder in the channel and hold the said shoulder tightly against said face, said tool-carrier including a body on which the said socket is formed; and a tilting head mounted on the body for orientation about an axis; and correlated means on said tilting head and said body for adjusting said tilting head into different adjusting oriented positions, including an extension projecting from one of the two parts, and a pair of adjusting screws carried by the other of said parts and engaging opposite sides of said extension for effecting said adjustments.

4. A tool-holder in accordance with claim 2, in which the direction of movement of the cam means is such as to draw the said shoulder of the tool-carrier against the said face on said base.

5. A tool-holder in accordance with claim 1, in which the said channel is formed with side walls converging toward each other in a downward direction with clearance present at the bottom of the channel so that the under face of the tool-carrier is out of contact with the same.

6. In a tool-holder for holding a cutter mounted in a machine-tool, the combination of a base having a channel therein, a tool-carrier adapted to rest in said channel and having a socket on the side thereof remote from the said channel, a rotatable locking-pin mounted on said base, located adjacent to said socket, said rotatable locking-pin having a notch on its side, and capable of assuming a position in which said notch provides clearance for passing said tool-carrier into position under said locking-pin, cam means associated with said pin adjacent said socket and cooperating with the same upon rotation of the said locking-pin, to clamp said carrier in said channel, said tool-carrier including a tilting head mounted to rotate on a substantially horizontal axis and capable of being clamped in different oriented positions about said horizontal axis, said tilting head having means for securing the cutter therein.

GLENN J. BRAUN.